No. 685,340. Patented Oct. 29, 1901.
P. J. MORAN.
NUT LOCK.
(Application filed Jan. 28, 1901.)
(No Model.)
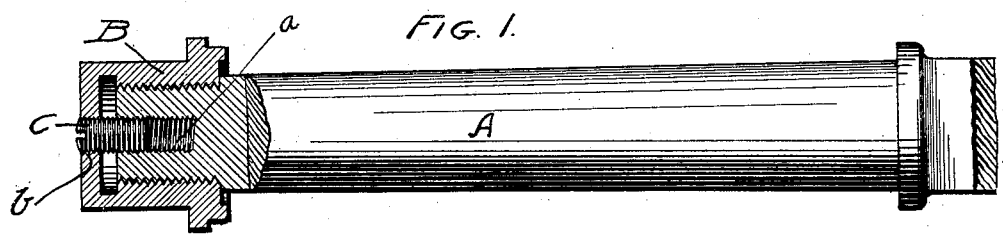
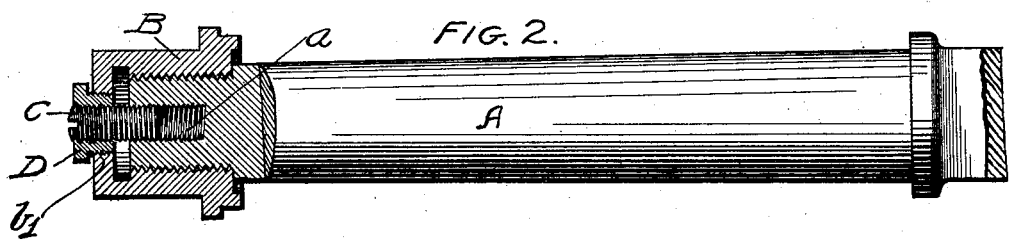
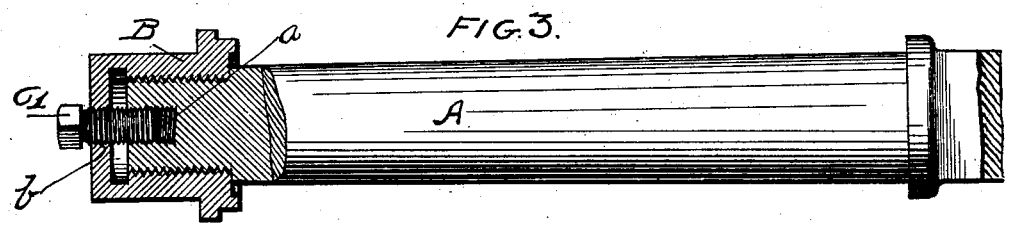
WITNESSES
F. H. Hiskell
C. W. Hiskell
INVENTOR.
Patrick J. Moran
J. H. Weatherford
his atty.

UNITED STATES PATENT OFFICE.

PATRICK J. MORAN, OF MEMPHIS, TENNESSEE.

NUT-LOCK.

SPECIFICATION forming part of Letters Patent No. 685,340, dated October 29, 1901.

Application filed January 28, 1901. Serial No. 45,086. (No model.)

*To all whom it may concern:*

Be it known that I, PATRICK J. MORAN, a citizen of the United States, residing at Memphis, Shelby county, State of Tennessee, have invented certain new and useful Improvements in Nut-Locks, of which the following is a specification.

My invention relates to certain new and useful improvements in nut-locks, and more especially to a nut-lock for closed nuts, such as are used on buggy-axles and the like.

My invention has for its object to provide a simple and efficient lock which will lock the nut in any position and will permit the removal of same without detaching the locking-piece from both nut and bolt, or, in other words, will not give an additional piece other than the nut to be kept up with.

Another object is to provide a lock which will hold in any position, be it tight or loose, and which will be of service so long as it is not detached from either the nut or the bolt.

I accomplish these objects by tapping a hole through the nut and into the end of the bolt and inserting a cap-screw, as will be more fully hereinafter set forth.

In the drawings, which show my nut-lock applied to the most common form of closed nut, Figure 1 is a sectional elevation of a buggy-axle, showing my lock applied to same. Figs. 2 and 3 are like elevations showing slight modifications.

Referring now to the drawings, in which like letters refer to like parts in all the views, A is a buggy-axle, and B a closed nut such as is used ordinarily on same.

$a$ is a hole tapped into the end of the axle A, and $b$ is a like hole through the nut B. C is a cap-screw screwed into these holes. The holes $a$ and $b$ may of course be tapped separately, but the best course is to first screw up the nut B and to then drill and tap the nut and axle together. The cap-screw C is then inserted and screwed in until it catches firmly in the axle end. It is preferably of such length that this will bring the head flush with the end of the nut B. The headless cap-screw shown slotted for a screw-driver is the one I prefer to use, though a set-screw C' (shown in Fig. 3) may be used, or a hexagonal, square head, or other ordinary form of cap-screw. In these latter cases where the head of the cap-screw is larger than the hole $b$ in the nut the cap-screw must be removed with the nut. Where this is the case, the screw, as C', is unscrewed until it is freed from the threaded hole $a$, and the nut is then unscrewed, carrying the screw with it. Where the headless screw C (or any screw having a head small enough to pass through the hole $b$) is used, it is preferred to screw same into the hole $a$ until it passes out of the hole $b$ in the nut B, when same is free to be removed, leaving the locking-screw in the end of the axle. This is, however, optional in this case, as the locking-screw may be removed with the nut, if so desired. Fig. 2 shows a slightly modified form, in which an externally-threaded nut D is screwed into the hole $b'$ in the nut B. The nut D is used to take up any looseness of the screw C in the nut B when same has been screwed up. The nut B is removed in exactly the same way as before, and any form of screw may be used, as in the other cases. When, however, the nut has been screwed down and the locking-screw inserted, the externally-threaded nut D may be given a partial turn and made to join the locking-screw and the axle-nut, so as to allow absolutely no play. The use of this special nut, however, interferes in no way with the principle or action of the remainder of the lock.

It will be noted that I have shown a right-handed thread on the screws C C' and that no mention has been made of the thread on the end of the axle A. The threads on axles are both right and left. With left-hand-threaded axles the right-hand cap-screw gives a right and left handed thread; with right-hand-threaded axles a differential thread, (the pitch of the cap-screw thread being, of course, less than that of the thread on the axle, since it is cut on a smaller blank.) I am thus enabled to secure a perfect lock on either right or left hand axles or bolts with a right (or left) hand cap-screw and to use either a right-hand or a left-hand screw (preferably a right-hand one) interchangeably on all axles and am therefore not under the necessity of having special taps or screws for the work.

It will be seen that no matter what the position of the locking-screw C may be, so long as it has any hold at all in both bolt and nut, the nut is positively locked against removal. The screw may be run in or out, it may jar in or out, and yet the locking action remains the same, for be where it may any attempt to remove the nut will join the threads of opposite or differential pitches and effectively block further movement.

Having thus fully described my invention, what I claim, and desire to secure by Letters Patent of the United States, is—

1. As a nut-lock, the combination with a threaded bolt end and a closed nut thereon, of a screw of less diameter than the said bolt, tapped through the closed nut and into the bolt end, said screw being threaded in the same direction as the said bolt, but being of different pitch, whereby a differential lock is secured between the threads of said screw and said bolt, substantially as shown and described.

2. As a nut-lock, the combination with a threaded axle end, a closed nut thereon, a hole tapped through said nut and a hole tapped into said axle end, of a screw engaging the threaded holes in said nut and axle end, said screw being threaded in the same direction as the said bolt, but being of different pitch, whereby a differential lock is secured between the threads of said screw and said bolt, all substantially as shown and described.

3. As a nut-lock, the combination with a threaded axle end, a closed nut thereon, a hole tapped through said nut and a hole tapped into said axle end, of a headless cap-screw engaging the threaded holes in said nut and axle end, said screw being threaded in the same direction as the said bolt, but being of different pitch, whereby a differential lock is secured between the threads of said screw and said bolt, all substantially as shown and described.

4. As a nut-lock, the combination with a threaded bolt end, a closed nut thereon, a hole tapped through said nut and a hole tapped into said bolt end, of a cap-screw engaging the threads of the hole of said nut and of said bolt end, said screw being threaded in the same direction as the said bolt, but being of different pitch, whereby a differential lock is secured between the threads of said screw and said bolt, substantially as shown and described.

5. As a nut-lock, the combination with a threaded bolt end, a closed nut thereon, a hole tapped through said nut, and a hole tapped into said bolt end, of a headless cap-screw engaging the threads of the hole in said nut and in said bolt end, said screw being threaded in the same direction as the said bolt, but being of different pitch, whereby a differential lock is secured between the threads of said screw and said bolt, substantially as shown and described.

6. As a nut-lock, the combination with a threaded bolt end, a closed nut thereon, a hole tapped centrally through said nut, and a hole tapped centrally into said bolt end, of a cap-screw engaging the threads of the hole in said nut and in said bolt end, said screw being threaded in the same direction as the said bolt, but being of different pitch, whereby a differential lock is secured between the threads of said screw and said bolt, substantially as shown and described.

7. As a nut-lock, the combination with a threaded bolt end, a closed nut thereon, a hole tapped centrally through said nut and a hole tapped centrally into said bolt end, of a headless cap-screw engaging the threads of the hole in said nut and in said bolt end, said screw being threaded in the same direction as the said bolt, but being of different pitch, whereby a differential lock is secured between the threads of said screw and said bolt, substantially as shown and described.

8. As a nut-lock, the combination with a threaded bolt end, a closed nut thereon, a hole tapped through said nut, an externally-threaded nut screwed into said hole, and a hole tapped into said bolt end, of a cap-screw engaging the threads of the hole in said externally-threaded nut and in said bolt end, said screw being threaded in the same direction as the said bolt, but being of different pitch, whereby a differential lock is secured between the threads of said screw and said bolt, substantially as shown and described.

9. As a nut-lock, the combination with a threaded bolt end, a closed nut thereon, a hole tapped centrally through said nut, an externally-threaded nut screwed into said hole, and a hole tapped centrally into said bolt end, of a cap-screw engaging the threads of the hole in said externally-threaded nut, and in said bolt end, substantially as shown and described.

10. As a nut-lock, the combination with a threaded bolt end, a closed nut thereon, a hole tapped centrally through said nut, an externally-threaded nut screwed into said hole, and a hole tapped centrally into said bolt end, of a headless cap-screw engaging the threads of the hole in said externally-threaded nut and in said bolt end, substantially as shown and described.

In testimony whereof I have signed my name to this specification in the presence of two subscribing witnesses.

PATRICK J. MORAN.

Witnesses:
R. LEE BARTELS,
J. B. DONOHO.